(12) United States Patent
Mitchell

(10) Patent No.: US 9,652,032 B2
(45) Date of Patent: May 16, 2017

(54) SIMULATED TRAINING ENVIRONMENTS BASED UPON FIXATED OBJECTS IN SPECIFIED REGIONS

(76) Inventor: Brian T. Mitchell, Swartz Creek, MI (US)

( * ) Notice: Subject to any disclaimer, the term of this patent is extended or adjusted under 35 U.S.C. 154(b) by 3397 days.

(21) Appl. No.: 11/511,707

(22) Filed: Aug. 29, 2006

(65) Prior Publication Data

US 2006/0290663 A1 Dec. 28, 2006

Related U.S. Application Data

(63) Continuation-in-part of application No. 11/070,038, filed on Mar. 2, 2005, now Pat. No. 8,721,341.
(60) Provisional application No. 60/712,197, filed on Aug. 29, 2005, provisional application No. 60/740,596, filed on Nov. 29, 2005, provisional application No. 60/549,489, filed on Mar. 2, 2004.

(51) Int. Cl.
*G09G 5/00* (2006.01)
*G06F 3/01* (2006.01)

(52) U.S. Cl.
CPC .................... *G06F 3/013* (2013.01)

(58) Field of Classification Search
CPC ........................................... G09G 5/00
USPC .................. 434/247; 345/156–158
See application file for complete search history.

(56) References Cited

U.S. PATENT DOCUMENTS

| | | | |
|---|---|---|---|
| 4,789,235 A | 12/1988 | Borah et al. | |
| 5,088,810 A * | 2/1992 | Galanter et al. | 351/203 |
| 5,471,542 A * | 11/1995 | Ragland | 382/128 |
| 5,875,108 A * | 2/1999 | Hoffberg et al. | 700/17 |
| 5,898,423 A | 4/1999 | Tognazzini et al. | |
| 5,926,182 A * | 7/1999 | Menon et al. | 345/421 |
| 6,091,378 A * | 7/2000 | Richardson et al. | 345/7 |
| 6,152,563 A * | 11/2000 | Hutchinson et al. | 351/209 |
| 6,243,076 B1 * | 6/2001 | Hatfield | 345/156 |
| 6,381,339 B1 * | 4/2002 | Brown et al. | 382/100 |
| 6,421,064 B1 * | 7/2002 | Lemelson et al. | 345/688 |
| 6,553,281 B1 * | 4/2003 | Liu | 700/302 |
| 6,577,329 B1 * | 6/2003 | Flickner et al. | 715/774 |
| 6,601,021 B2 | 7/2003 | Card et al. | |
| 6,606,480 B1 * | 8/2003 | L'Allier et al. | 434/362 |
| 6,608,615 B1 * | 8/2003 | Martins | 345/156 |
| 6,637,883 B1 * | 10/2003 | Tengshe et al. | 351/210 |
| 6,712,468 B1 * | 3/2004 | Edwards | 351/209 |
| 6,734,853 B2 * | 5/2004 | Heim et al. | 345/421 |
| 6,803,887 B1 | 10/2004 | Lauper et al. | |

(Continued)

*Primary Examiner* — Timothy Musselman
*Assistant Examiner* — Alvin Carlos
(74) *Attorney, Agent, or Firm* — Mitchell Law PLLC; Matthew W. Mitchell

(57) ABSTRACT

Objects associated with fixation regions are used to support training tasks that are characterized by operation within a dynamic 3D environment, problem-solving that involves user multi-tasking, fast decisions, heavy workloads, potential for unexpected events, and the need for high-performance skills. The invention is ideally suited to measure the nuances associated with maintaining situation awareness in such tasks where dynamic 3D environments that support problem solving with high cognitive fidelity have already been developed. Potential training application areas include urban warfighting, night vision goggle use, aircraft piloting, helicopter operation, remote control of vehicles and robots, night driving, air traffic control, and quarterback decision-making.

31 Claims, 11 Drawing Sheets

(56) References Cited

U.S. PATENT DOCUMENTS

| | | | |
|---|---|---|---|
| 7,029,121 B2* | 4/2006 | Edwards | 351/246 |
| 7,197,165 B2* | 3/2007 | Ryan | 382/103 |
| 2002/0103625 A1* | 8/2002 | Card et al. | 702/187 |
| 2003/0126471 A1* | 7/2003 | Hillis et al. | 713/201 |
| 2003/0146901 A1* | 8/2003 | Ryan | 345/158 |
| 2003/0175675 A1* | 9/2003 | Pearson et al. | 434/350 |
| 2004/0075645 A1* | 4/2004 | Taylor et al. | 345/157 |
| 2004/0156020 A1* | 8/2004 | Edwards | 351/209 |
| 2005/0177065 A1* | 8/2005 | Ghajar | 600/558 |

* cited by examiner

<eye-event,
gaze-point: (X, Y),
time: $t_e$,
fovea: (object$_{i1}$, ..., object$_{in}$),
parafovea: (object$_{j1}$, ..., object$_{jn}$),
periphery: (object$_{k1}$, ..., object$_{kn}$),
properties: (property$_1$, ..., property$_n$)>

Figure 3

SIMULATED TRAINING ENVIRONMENTS BASED UPON FIXATED OBJECTS IN SPECIFIED REGIONS

REFERENCE TO RELATED APPLICATION

This application claims priority from U.S. Provisional Patent Application Ser. Nos. 60/712,197, Aug. 29, 2005 and 60/740,596, filed Nov. 29, 2005. This application is also a continuation-in-part of U.S. patent application Ser. No. 11/070,038 filed Mar. 2, 2005, which claims priority from U.S. Provisional Patent Application Ser. No. 60/549,489, filed Mar. 2, 2004. The entire content of all of which are incorporated herein by reference.

FIELD OF THE INVENTION

This invention relates to a system and method for calculating eye events (or foveated-object events) that correspond to visual fixations on objects within a dynamic field of view, and more particularly, to such a system in which fixation regions are registered to an internal computer model that represents the field of view to determine the fixated objects within the model, an eye event that corresponds to those objects is constructed and placed in the computer environment, and the resulting eye events are subsequently used by computer applications as input user interaction information.

BACKGROUND OF THE INVENTION

Over the last decade eyetracking systems have become increasingly sophisticated. Several eyetracking systems are currently available as commercial products. These systems are typically based on three methods: video oculography (VOG), infrared oculography (IROG), and electro-oculography (EOG). The VOG method calculates eye position based on the relative position of the cornea and reflected pupil glint. This method uses a video camera to capture images of the eye, an infrared emitter to produce a point reflection on the eye images, and image processing methods to extract geometrical information from the images. The IROG method calculates eye position based on the amount of reflected light. This method uses mounted infrared emitters to produce reflections off of the eye, detectors that measure reflected light, and algorithms that determine eye position from the distribution of light across the geometrically located detectors. The EOG method calculates eye position based on electrical signals that are generated from electrodes placed around the eye. This method uses the signals from the geometrically positioned electrodes and algorithms that determine eye position from the distribution of signals across the electrodes. Each of these three methods typically locates eye position as an (x,y) point on a viewing plane or as a point (x,y,z) in 3-space at the rate of 1/30 second or faster.

Despite significant progress, widespread application of the technology has failed to become a reality. In part, this is due to the remaining high cost of eyetracker devices. An additional barrier, however, is the difficulty in mapping the sequence of fixation points produced by an eyetracker to objects that are present in the individual's field of view. Because of the point-to-object problem, successful use of eyetracker technology often requires manual frame-by-frame identification of fixated objects [Jacob & Karn, 2003]. Although this is adequate for some research applications, it is simply too costly and too cumbersome for widespread use.

Attempts at automating the mapping of points to objects have proven difficult. Generally, these attempts have fallen into two classes. One class involves using image-processing techniques to segment objects from a captured video sequence that corresponds to the field of view. Another class involves using features of the application to make the identification of objects easier. Although successes have been developed using approaches from both of these classes, a general solution to the point-to-object problem still remains unsolved.

The development of algorithms that automatically segment objects from a captured rasterized image stream has received much attention in the research literature. Despite extensive work, general-purpose, high-performance segmentation algorithms have proven elusive. Current segmentation algorithms often require custom development and remain error prone. Many of the current methods and techniques for automatic segmentation are described in [Fu & Mui, 1981], [Haralick & Shapiro, 1985], and [Pal & Pal, 1993]. An example of the segmentation approach is found in U.S. Pat. No. 6,803,887 that discloses a method for supplying a mobile user with service information relating to real world objects. This method relies on and assumes segmentation of real-world objects captured in raster format. It does not consider objects that are rendered on a computer display.

Applications that solve the point-to-object problem using problem features or problem simplifications have been reported in the research literature on gaze-responsive interfaces and gaze-responsive media. An approximate method that uses ray casting and a bounding sphere test was reported in an interactive fiction system in which the links that provide additional information are activated by eye gazes [Starker and Bolt, 1990]. A review of methods in gaze-based icon selection was discussed in [Jacob, 1993]. An eye control system for disabled users, EagleEyes, describes a control method based on clickable areas and a game, Eye-Venture, in which looking at objects causes a video to be played or a voice to give instructions or a clue [Gips and Olivieri, 1996]. An application which identifies chessboard squares as viewed objects in a chess game was discussed in [Spakov, 2005].

Several methods for solving the point-to-object problem using problem features have been disclosed in the U.S patent literature. U.S. Pat. No. 4,789,235 discloses a method and system for monitoring people watching television commercials. The disclosed method relies on the use of visual areas of interest with fixed locations on different television scenes. U.S. Pat. No. 5,898,423 discloses a method that detects an intersection of the gaze position with the image displayed on the display device. The disclosed method relies on the fact that at any point in time an image location is fixed and known as found in the display of text images. U.S. Pat. No. 6,601,021 discloses a method for mapping fixation points to objects (elements-of-regard) in a display of dynamic hypermedia pages through a browser that is connected to the world-wide-web. The invention discloses a mapping tool that maps fixations onto restored web pages to identify fixated objects that are contained within the web pages. The mapping tool identifies elements of restored web pages by accessing the object model interface of the browser that provides the content information for each of the rendered objects (elements). The objects are generally HTML elements that the browser renders and include text, images, hyperlinks, buttons, input boxes, etc. This method relies on the fact that objects in restored web pages have known locations.

The more general problem of mapping fixation regions to objects has received limited attention in the literature. U.S. Pat. No. 6,803,887 describes a mobile device that locates objects in regions using predefined eye position values. U.S. Pat. No. 7,029,121 uses eyetracking data to determine whether an individual has looked at a particular region of a visual field, but does not identify objects within the region. A cognitive architecture, EPIC, describes a visual processor with three visual regions (fovea typical radius 1°, parafovea typical radius 10°, and periphery typical radius 60°) that models the recognition of objects within these regions [Kieras et al., 1997].

Many application areas that require an understanding of when objects are fixated to explore and exploit the subtle differences found in the problem-solving methods of individuals could greatly benefit from a robust and real-time solution to the region-to-object problem in dynamic graphical environments that simulate the real world. Such a solution would enable the construction of eye events that capture a user's visual interaction with a display screen in computer applications that use a graphical user interface to simulate the real world and to communicate with the user. In advanced training systems, eye events would enable the measurement of how an individual maintains situation awareness in complex problem-solving tasks. In the area of cognitive science, eye events would enable the exploration of how an individual allocates critical cognitive resources while operating in a multi-tasking problem solving environment. In vehicle systems, eye events would enable recording of operator visual interactions with the environment for later analysis directed at understanding the operator's cognitive activity during a critical operational time period. In interface evaluation, eye events would allow more detailed understanding of how computer users interact with a computer application under study in time critical or production settings. In computer games, eye events would allow the development of games with behaviors of the objects within the game that are derived from the movement of the game player's eyes. In cooperative interfaces, eye events would enable the development of interfaces that assist the human operator in solving complex problems by observing the operator's behavior and redirecting the operator to time critical needs and/or invoking intelligent agents (or processes) that would synergistically solve other parts of the problem.

SUMMARY OF THE INVENTION

The present invention resides in a novel approach to calculating the objects associated with eye fixations. The benefits of this approach are significant. The invention is well-suited to support training tasks that are characterized by operation within a dynamic 3 D environment, problem-solving that involves user multitasking, short decision time periods, heavy workloads, potential for unexpected events, and the need for high-performance skills. It is ideally suited to measure the nuances associated with maintaining situation awareness in such problems where dynamic 3 D environments that support problem solving with high cognitive fidelity have already been developed. Potential training application areas include urban warfighting, night vision goggle use, aircraft pilot, helicopter operation, remote control of vehicles and robots, night driving, sports decision making, air traffic control, personnel selection, attention management for situation awareness, soldier skills, vigilance methods, aged performance, attention management rehabilitation, and cognitive rehabilitation.

While the preferred embodiment of the present invention uses eye events to train individuals, other embodiments use eye events to conduct research in cognitive problem solving, to record meaningful data from vehicle operation, to perform in-depth interface evaluation on computer applications, to develop advanced computer games, and to develop cooperative computer user interfaces.

The system of the present invention involves a calculation of the graphical objects associated with a display fixation region. Three embodiments are described. The first tests for display pixel changes after each object is drawn to determine the fixated objects. The second writes a unique bit pattern into the non-display portion of each pixel as the objects are drawn so that every pixel knows its corresponding object. The third orders the graphics objects that intersect rays emitting from the viewpoint and passing through the fixation region pixels.

Once the fixation objects are determined, they are used to create eye events. An eye event is a computer event that tracks human eye movements on a computer screen similar to the way in which mouse-events track mouse-movements on a computer screen. When the eye fixates or moves on the computer screen, an event is generated and made available for use by the application. The event identifies the time the fixation region was sampled, the fixation region properties, the fixated-objects list, and possibly the type of movement that produced the event. The resulting event is then available to computer programs written using a conventional event-loop programming style. With eye events computer programs can then be written using graphics objects that "know" when they are viewed.

BRIEF DESCRIPTION OF THE DRAWINGS

FIG. 3 is a diagram representation of eye-event elements;

DETAILED DESCRIPTION OF THE INVENTION

Figure 1:
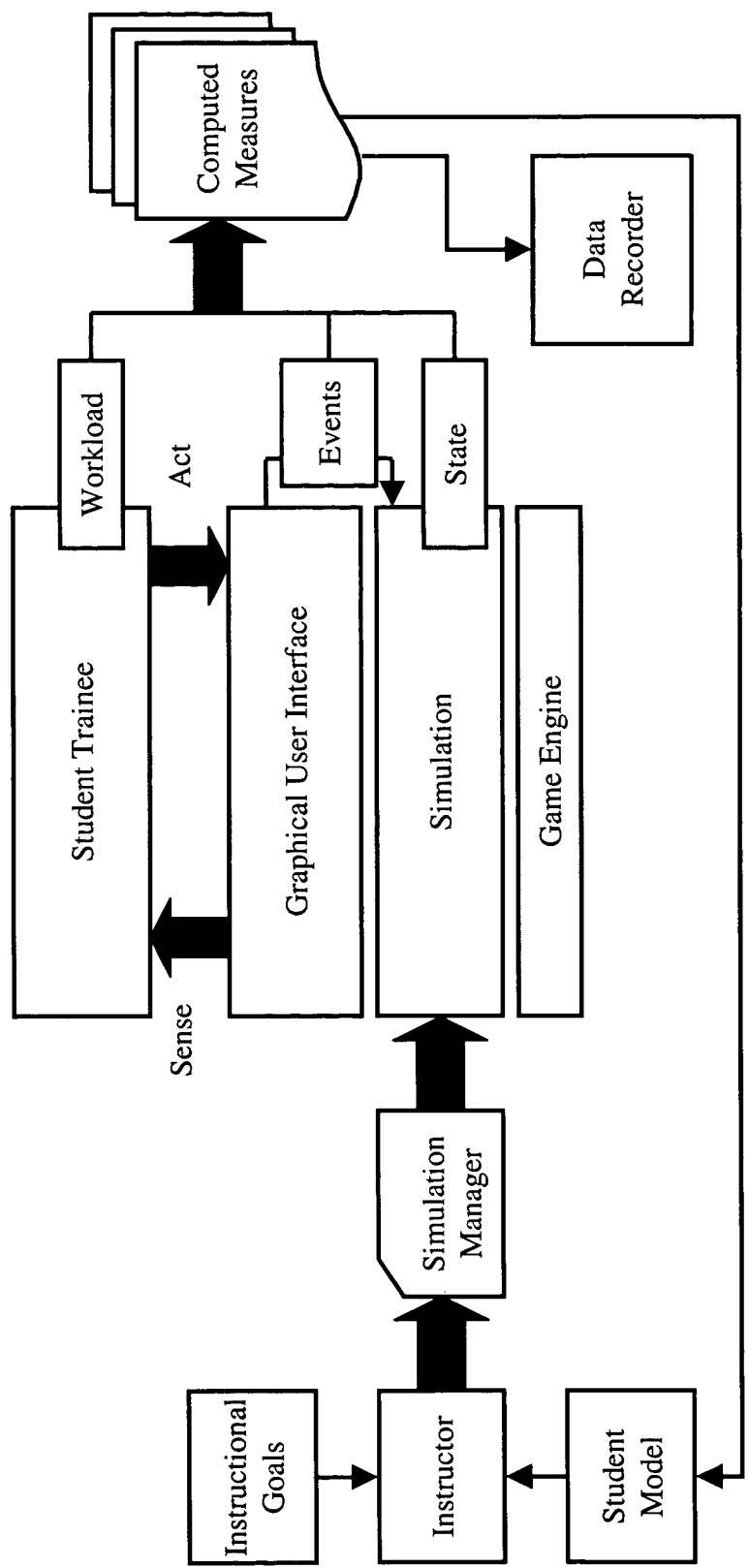
FIG. 1 is a block diagram of an eye-event-based training system according to the invention.

FIG. 1 is a block diagram of an eye-event-based student training system according to the invention. The trainee interacts through a graphical user interface with a computer simulation that may be built using a game engine. As with all of the embodiments described herein, the operator workload is optional and the degree of complexity associated with the system state is variable.

A simulation manager responds to feedback that results from student trainee interaction with the interface by dynamically directing the activities and presentation of the simulation. As the simulation is running, workload, events, and simulation state data are collected and combined to form computed measures that may be recorded using a data recorder for later analysis and/or playback. The computed measures are fed back into a student model that represents current student understanding. An instructor dynamically synthesizes the current student understanding in the student model with the overall instructional goals and provides instructional direction to the simulation manager.

The system trains the student trainee in a high-performance skill. The computed measures capture subtle training aspects. In turn, an understanding of these aspects can be used to focus training. The eye events enable the development of this system as they capture the manner in which the trainee utilizes critical cognitive resources. This enables the development of computed measures that couple trainee workload and simulation state to cognitive activities.

The graphical user interface (GUI) is a well-known component of modern computer applications. It typically includes windows, menus, cursors, dialogs, and graphical scenes. The simulation module implements the training interactions that develop trainee skills. A simulation can be developed using a game engine to layer the code development as depicted in the figure. It can also be developed from scratch.

The game engine consists of content development, character modeling and animation, and world building tools; scripting, game control mechanisms, artificial intelligence (AI) and character control, and physics code modules; rendering, lighting, and sound system libraries; and networking capabilities. A description of game engine construction can be found in [Zerbst & Duvel, 2004], [Eberly, 2004a], and [Eberly, 2004b].

The trainee workload can be measured using a variety of methods that are well known to the field of biomedical engineering. Typical methods described in the literature include cardiac measurement methods such as heart rate and HRV; ocular measurement methods such as blink rate and blink duration; respiratory measurement methods such as respiration rate and depth; brain activity measurement methods such as EEG, ERP, ERN, PET, fMRI, NIR, and fNIR. An overview of such methods can be found in The BioMedical Engineering Handbook edited by J. D. Bronzino, and first published in 1995 by CRC Press, Inc. [Bronzino, 2000].

Figure 2:
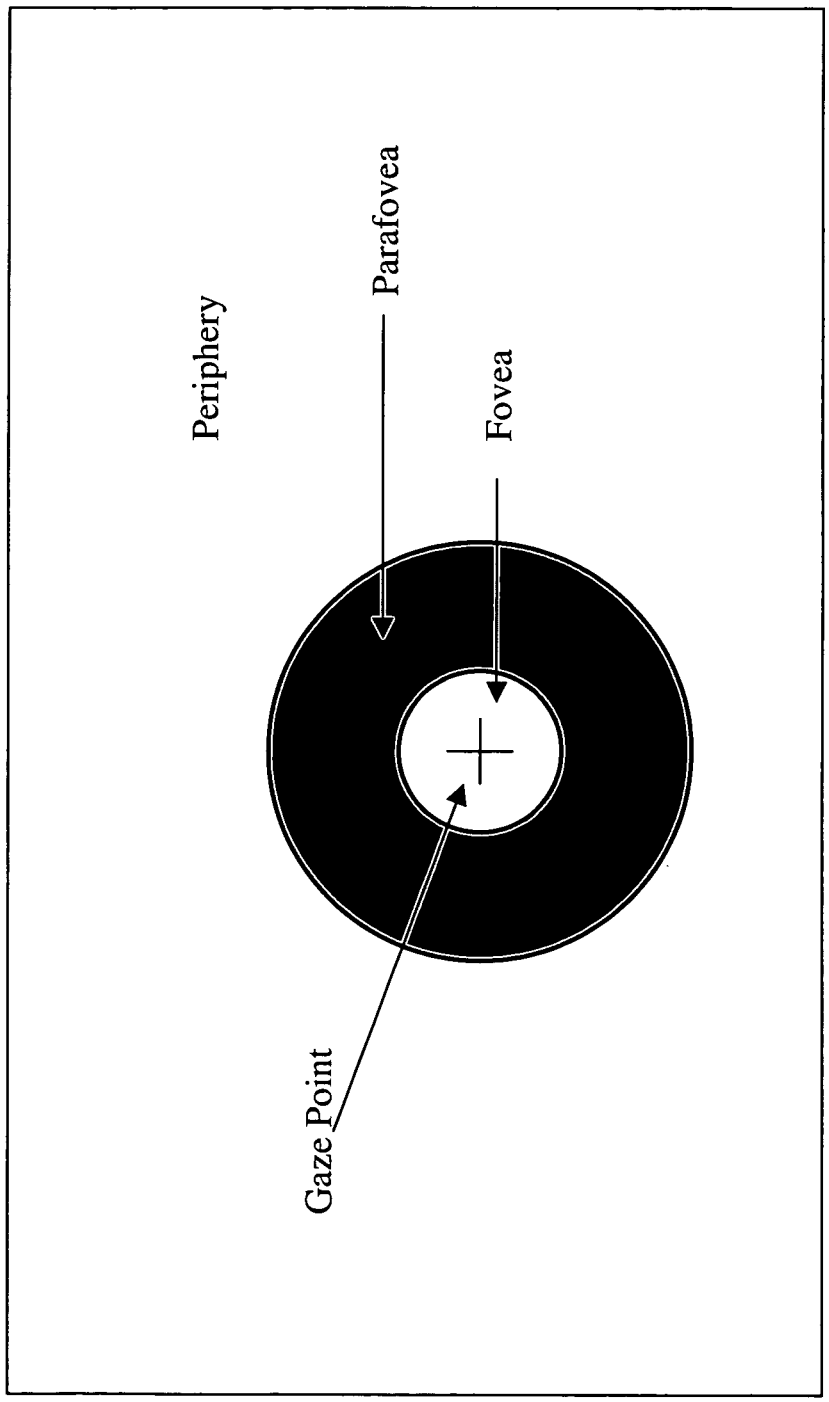
FIG. 2 is a diagram of typical fixation regions.

The events consist of well-known events found in event-loop programming languages and eye events, including menu events, mouse-movement events, mouse-click events, and keyboard events. The eye events are produced when the user visually fixates or visually tracks graphics objects present in the user interface. The eye events let simulation objects that are displayed on the user interface know when they are viewed or fixated. FIG. 2 illustrates typical fixation regions. The gaze point defines the center of the visual fixation found at the intersection point of the two vertical and horizontal lines. The fovea, parafovea, and peripheral regions correspond to the foveal, parafoveal, and peripheral areas of the human vision system produced by the fixation. FIG. 3 illustrates a typical eye-event data structure that corresponds to the typical fixation regions. In the figure, the eye event has six elements: the gaze point, time, fovea, parafovea, periphery, and properties. The gaze point element defines the center of the visual fixation. The time element defines the time the eye event occurred. The fovea, parafovea, and periphery elements identify the objects found in each of the fixation regions. The properties element stores additional properties associated with the eye event.

The state represents the current condition of the dynamic nature of the simulation. The state can be represented by a variety of standard computer representations such as a vector, array, structure, object, or finite state machine. It may include a history of conditions that allowed the simulation to reach the current state. It may also include a set of attributes that further describe each of the elements of the current state.

The computed measures are calculated using trainee workload values, events from the augmented event loop, and the state of the training simulation. These measures quantify such concepts as use of slack time, workload balance, switching overhead, efficiency of uncertainty resolution, use of strategic automaticity, use of daring scheduling, risk management, efficiency of awareness, parallelism of problem solving, optimum use of decision timelines, and maintenance of safe performance envelopes. These measures may also include pass-through values associated with workload, events, and state values.

The data recorder records the trainee workload, events from the augmented event loop, simulation state, and the computed measures for later review and analysis. The student model maintains an understanding of the current state trainee learning. It receives feedback from the computed measures and uses this feedback to update the model.

The instructional goals describe the overall goals associated with developing trainee skills. These goals are normally developed offline by instructional experts. The instructor is a computer module that decides how best to develop trainee skills. The module reviews student progress towards the instructional goals by inspecting the student model and recommends the instructional course of action to the simulation manager. The simulation manager directs the simulation to exhibit behaviors that enable further student training and learning of the instructional goals.

Figure 4:
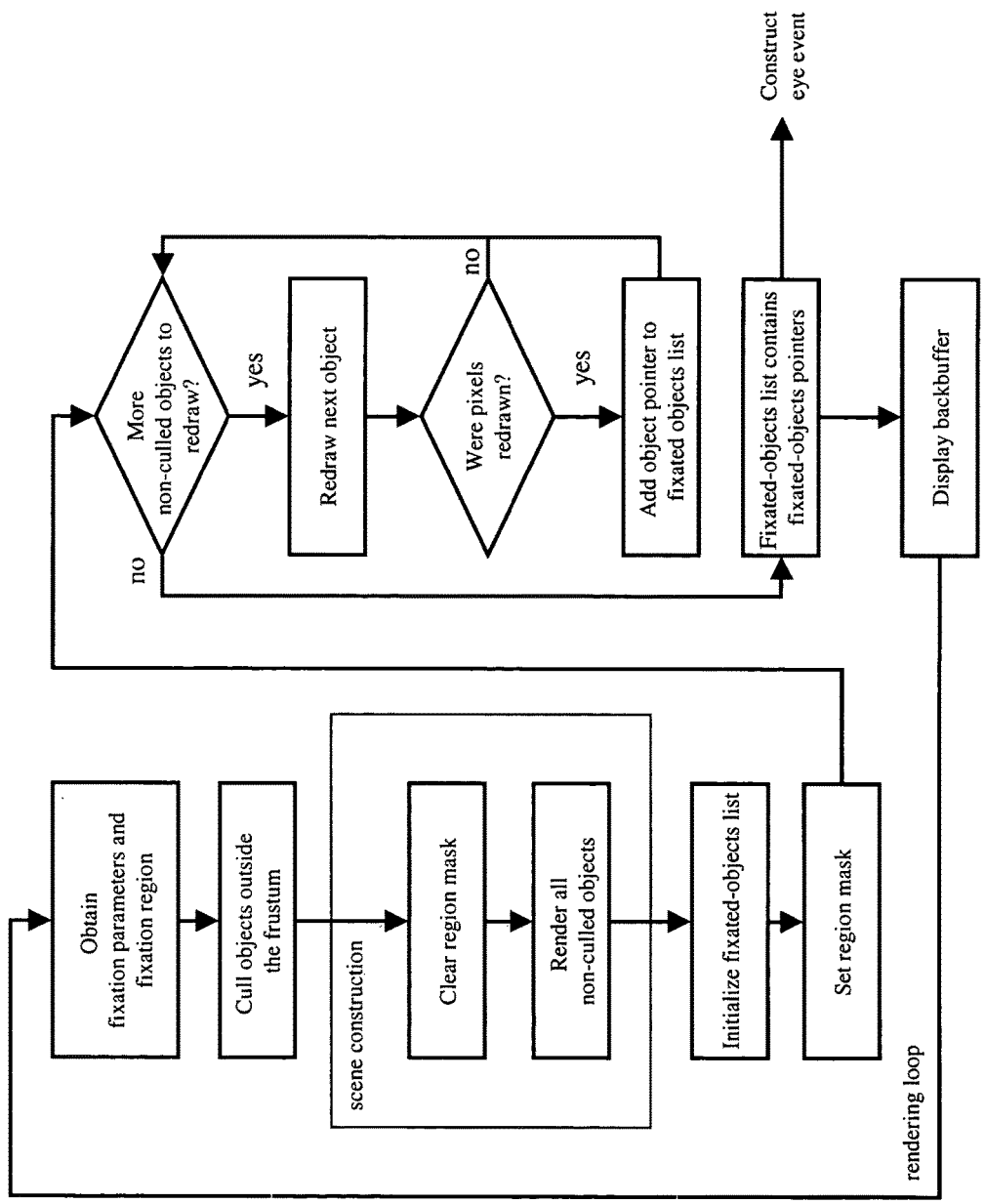
FIG. 4 is a flow chart representation of a preferred computational method for eye-events based on change detection in pixel values.

FIG. 4 describes the preferred method for computing eye events. The preferred method uses change detection to calculate the objects that are referenced by the elements in the fixated-objects list. The figure specifies the main graphics-rendering loop of the system. Each iteration of the loop determines the fixated objects in the fixation region that correspond to the current fixation parameters, and uses those fixated objects to construct an eye event.

At the beginning of each rendering-loop iteration, the fixation parameters and fixation region are obtained. Next, the objects outside the frustum are optionally culled. This reduces the number of objects to draw and redraw. The region mask is then cleared and the non-culled objects are drawn to a buffer surface usually referred to as the back-buffer. This sets the depth information for all surface pixels in the corresponding Z-buffer. Next, the fixated-objects list is assigned an initial null value. A region mask is then set so that only the pixels in the fixation region of the viewport can be drawn. Each non-culled object is then redrawn. Immediately after each object is redrawn, the pixels are tested to determine if any pixels in the fixation region were redrawn. If pixels in the fixation region were redrawn, the object is added to the fixated-objects list. After all objects are redrawn, the fixated-objects list contains pointers to the fixated objects in the fixation region. An eye event is then created, and minimally contains or references the time the event occurred, the viewing parameters, attributes of the fixation region, and the list of pointers to the fixated objects found in the fixation region.

The rendering loop is typically the main graphics loop of a simulation or game. Usually, the rendering loop runs continuously and each iteration repaints the scene on a buffer associated with the viewport. The viewport is a finite rectangle on the viewing plane. The viewing plane is an infinite plane between the viewpoint and the objects in the graphics scene. When the scene is rendered, graphical objects are projected onto the viewport to create a 2D projection of the 3D scene. The viewport is subdivided into rectangular elements of equal size called pixels. The pixels are configured in rows and columns, and cover the viewport. Each pixel contains display, depth, and masking information. The pixel display information is represented in a data structure called a surface or a buffer. The display surface is the data structure associated with the graphics display. The pixel depth information is represented in a data structure called the Z-buffer. The pixel mask information is represented in a data structure called the stencil buffer. Examples of rendering loops can be found in popular DirectX and OpenGL documentation.

The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

The object pointer is a computer word that points to an object location. The object pointer contains an address where the computer object that represents the graphics object is found.

The fixation parameters are the viewpoint, lookatpoint, and upvector. The viewpoint is the point from which the scene is viewed. It can be thought of as being the position of the eye that views the scene. The lookatpoint or display fixation point is the point on the viewport at which the eye is pointed. The upvector is a vector that defines the up direction of the scene. The fixation parameters can be obtained from an actual eye-tracking device, a virtual eye-tracker, a device that emulates an eye-tracker, or a cognitive architecture that models eye movement. An eye-tracker is a hardware device that follows an individual's eyes to determine current eye position. An eye-tracker can be obtained as a commercial product. Typical eye-trackers capture eye position every $1/30^{th}$ of a second or faster. The software that accompanies most eye-trackers includes an API for integrating the eye-tracker directly into application systems and registering the eye position with the application display screen to produce the display fixation point.

The fixation region is a collection of pixels on the viewport. The fixation region is calculated as a function of the lookatpoint and the viewport. The fixation region may or may not be contiguous. It may be thought of as a set of pixels in the viewport. Typically the fixation region is a circular or rectangular region centered at the lookatpoint. In the simplest case, the fixation region becomes a fixation point when the fixation region corresponds to a single pixel on the viewport.

The non-culled objects are the graphical objects that are contained within the viewing frustum. The viewing frustum is the part of the 3D space that is projected onto the viewport. The exact shape of the frustum varies, but typically it is a rectangular pyramid. The planes that define the frustum perpendicular to the viewing direction are called the near plane and the far plane. Objects that are closer to the viewpoint than the near plane are not in the frustum. Objects beyond the far plane are not in the frustum. Frustum culling is the process of removing objects that lie completely outside the viewing frustum from the rendering process. Since the culled objects cannot appear in the scene, there is no point in drawing them. Thus, only non-culled objects need to be drawn and redrawn.

The fixated objects are the objects that are visible in the fixation region on the viewing plane.

The fixated-objects list is a list of object pointers that reference the fixated objects that are visible on the viewing plane and in the fixation region. This list is initially null and is dynamically constructed through this computation method.

The region mask allows drawing only in the fixation region. When the region mask is set, rendered objects can only change the pixel values within the fixation region.

The backbuffer or display backbuffer implements a standard graphics technique in which the backbuffer and the display surfaces are flipped. Graphics objects are drawn on the backbuffer until the scene is fully painted. Then the back and display buffers are flipped. That is the backbuffer becomes the display surface and the display surface becomes the backbuffer surface. Routines to implement these operations are normally found in the SDKs of the graphics libraries supported by the computer video card.

The eye event is a computer data element that represents the occurrence of fixated objects. The eye event minimally includes the time the fixation region was sampled, the fixation region properties, the fixated-objects list, and possibly the type of movement that produced the event. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object behaviors, and animating objects in response to viewing.

The method described with reference to FIG. 4 calculates the fixated objects for a single fixation region. The method can be extended in an obvious manner to calculate the fixated objects for multiple fixated regions. The method described with reference to FIG. 4 does not alter the rendering pipeline associated with modern computer video cards. Rather, it uses the functionality found in video cards to test changes that may occur after an object is drawn to determine what objects are visible within the fixation region.

In modern graphics systems supported by video graphics cards such as DirectX or OpenGL, this method can be implemented by using the Z-buffer to determine pixel depth when the scene is first drawn, using the stencil buffer to implement the region mask, and using occlusion queries to determine if any pixels were redrawn in the fixation region for each object. In certain applications computational efficiencies can be obtained when computing the fixated objects by redrawing to a down-sampled surface. A simplified version of this method where the viewing region is rectangular can be implemented by using a scissors test. Future advances in video architectures may eliminate the need to first draw and then redraw the objects.

Figure 5:
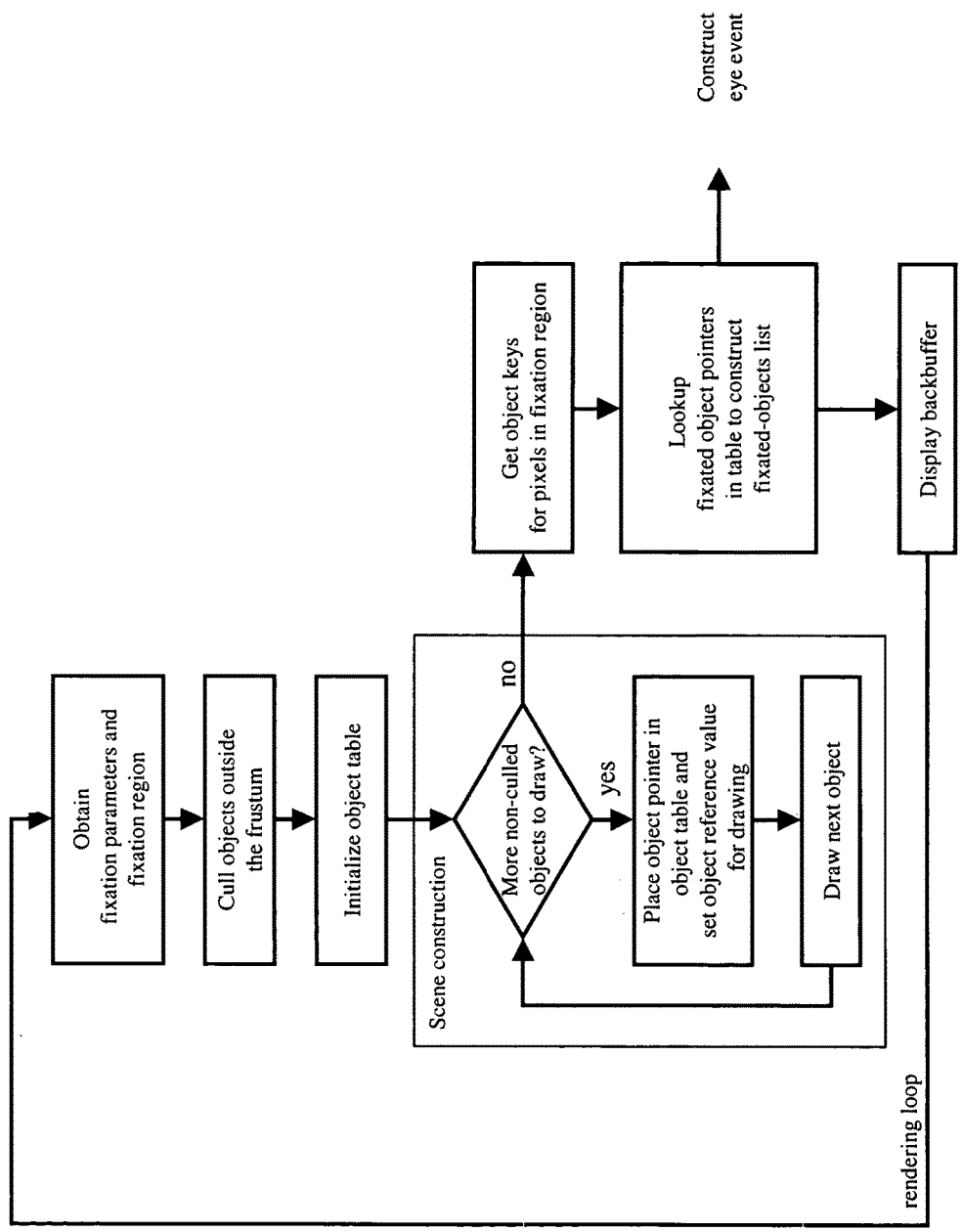
FIG. 5 is a flowchart representation of an alternative computational method for eye-events based on non-display pixel values.

FIG. 5 describes an alternative method for computing eye events. The method sets non-display pixel values that can later be used to retrieve object pointers. The figure specifies the main graphics-rendering loop of the system. Each iteration of the loop determines the fixated objects in the fixation region that correspond to the current fixation parameters, and uses those fixated objects to construct an eye event.

At the beginning of each rendering-loop iteration, the fixation parameters and fixation region are obtained. Next, the objects outside the frustum are optionally culled. This reduces the number of objects to draw. The object table is initialized as empty. Before each object is drawn in the rendering loop a pointer to the object is placed in the object table and the object reference value is set to the object key that corresponds to the location of the object in the object table. As each object is drawn, the object reference value is coded into a field in the non-display pixel bits for each pixel that is altered. After all objects are drawn, the non-display bits for each pixel contain information that corresponds to the index of the object present at that pixel. The object keys are retrieved for the pixels in the fixation region. The keys are then used to lookup the object pointers in the object table. The object pointers are organized into the fixated-objects list. An eye event is then created, and minimally contains or references the time the event occurred, the viewing parameters, attributes of the fixation region, and the list of pointers to the fixated objects found in the fixation region.

The rendering loop is typically the main graphics loop of a simulation or game. Usually, the rendering loop runs continuously and each iteration repaints the scene on a buffer associated with the viewport. The viewport is a finite rectangle on the viewing plane. The viewing plane is an infinite plane between the viewpoint and the objects in the graphics scene. When the scene is rendered, graphical objects are projected onto the viewport to create a 2D projection of the 3D scene. The viewport is subdivided into rectangular elements of equal size called pixels. The pixels are configured in rows and columns, and cover the viewport. Each pixel contains display, depth, and masking information. The pixel display information is represented in a data structure called a surface or a buffer. The display surface is the data structure associated with the graphics display. The pixel depth information is represented in a data structure called the Z-buffer. The pixel mask information is represented in a data structure called the stencil buffer. Examples of rendering loops can be found in popular DirectX and OpenGL documentation.

The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

The object pointer is a computer word that points to an object location. The object pointer contains an address where the computer object that represents the graphics object is found.

The fixation parameters are the viewpoint, lookatpoint, and upvector. The viewpoint is the point from which the scene is viewed. It can be thought of as being the position of the eye that views the scene. The lookatpoint or display fixation point is the point on the viewport at which the eye is pointed. The upvector is a vector that defines the up direction of the scene. The fixation parameters can be obtained from an actual eye-tracking device, a virtual eye-tracker, a device that emulates an eye-tracker, or a cognitive architecture that models eye movement. An eye-tracker is a hardware device that follows an individual's eyes to determine current eye position. An eye-tracker can be obtained as a commercial product. Typical eye-trackers capture eye position every $1/30^{th}$ of a second or faster. The software that accompanies most eye-trackers includes an API for integrating the eye-tracker directly into application systems and registering the eye position with the application display screen to produce the display fixation point.

The fixation region is a collection of pixels on the viewport. The fixation region is calculated as a function of the lookatpoint and the viewport. The fixation region may or may not be contiguous. It may be thought of as a set of pixels in the viewport. Typically the fixation region is a circular or rectangular region centered at the lookatpoint. In the simplest case, the fixation region becomes a fixation point when the fixation region corresponds to a single pixel on the viewport.

The object table is a data structure that is indexed by the object key and stores object pointers. The object reference value is a bit-pattern that represents an object key for the object that is currently being drawn. The object reference value is written into bits in the non-display portion of each pixel that is modified when the object is drawn.

The object key is a key that allows lookup in the object table. The simplest key is the row index of the object table. The bit-pattern written into the non-display portion of each pixel using the object reference value is then used to determine the object key. Typically the object reference value and the object key represent the same coding for table keys. The only distinction is that the object key is associated with the visible object and the object reference value is associated with an arbitrary object as it is being drawn. The visible object is the object that is visible at the display pixel.

The non-culled objects are the graphical objects that are contained within the viewing frustum. The viewing frustum is the part of the 3D space that is projected onto the viewport. The exact shape of the frustum varies, but typically it is a rectangular pyramid. The planes that define the frustum perpendicular to the viewing direction are called the near plane and the far plane. Objects that are closer to the viewpoint than the near plane are not in the frustum. Objects beyond the far plane are not in the frustum. Frustum culling is the process of removing objects that lie completely outside the viewing frustum from the rendering process. Since the culled objects cannot appear in the scene, there is no point in drawing them. Thus, only non-culled objects need to be drawn and redrawn.

The fixated objects are the objects that are visible in the fixation region on the viewing plane.

The fixated-objects list is a list of object pointers that reference the fixated objects that are visible on the viewing plane and in the fixation region. This list is initially null and is dynamically constructed through this computation method.

The backbuffer or display backbuffer implements a standard graphics technique in which the backbuffer and the display surfaces are flipped. Graphics objects are drawn on the backbuffer until the scene is fully painted. Then the back and display buffers are flipped. That is the backbuffer becomes the display surface and the display surface becomes the backbuffer surface. Routines to implement these operations are normally found in the SDKs of the graphics libraries supported by the computer video card.

The eye event is a computer data element that represents the occurrence of fixated objects. The eye event minimally includes the time the fixation region was sampled, the fixation region properties, the fixated-objects list, and possibly the type of movement that produced the event. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object behaviors, and animating objects in response to viewing.

The method described with reference to FIG. 5 calculates the fixated objects for a single fixation region. The method can be extended in an obvious manner to calculate the fixated objects for multiple fixated regions. The method described with reference to FIG. 5 does not alter the rendering pipeline associated with modern video cards. Rather, it uses the functionality found in video cards to write a unique object reference value into the non-display bits for each pixel that is drawn by an object. After all objects are drawn, the object reference value associated with the display fixation point is retrieved and used to lookup the object pointer associated with the fixated object in the object table.

In modern graphics systems supported by video cards such as DirectX and OpenGL, this method can be implemented by writing the object reference value into the stencil buffer for every drawn pixel. When all objects are drawn, the stencil-buffer value for each pixel will correspond to the object table index for the object present at the corresponding pixel.

Figure 6:
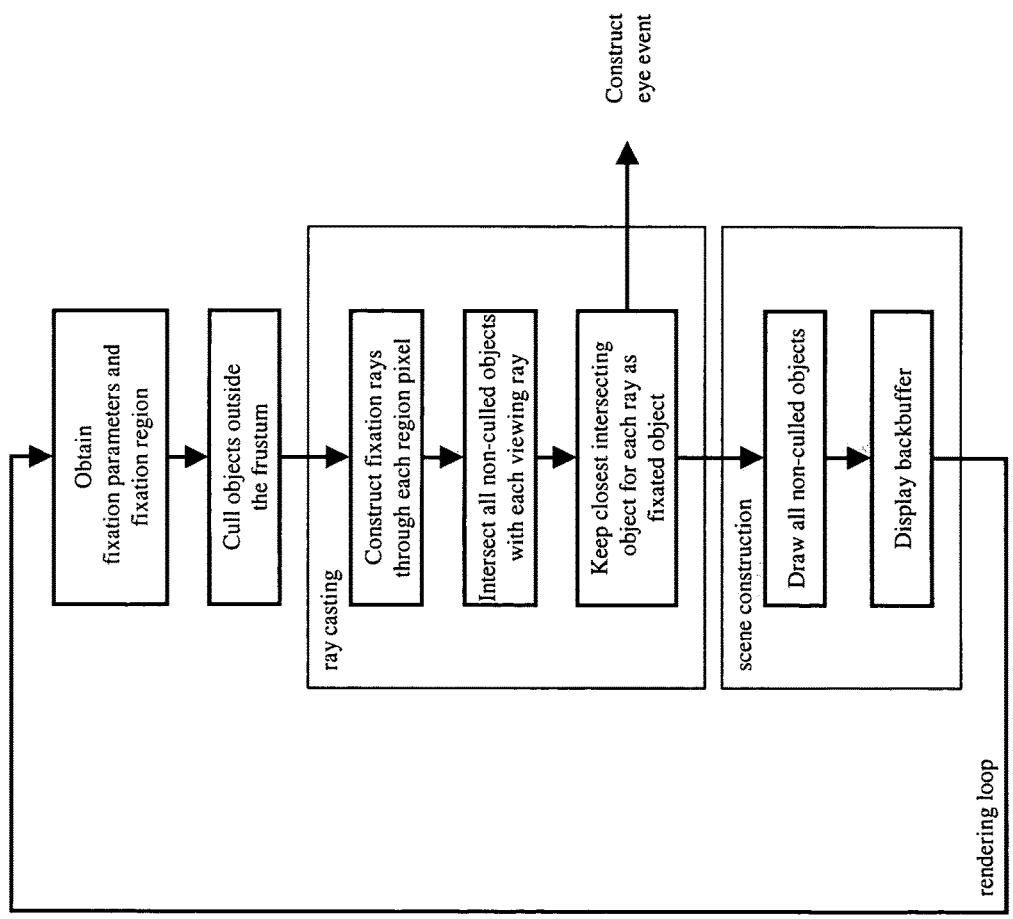
FIG. 6 describes a second alternative method for computing eye events based on a ray-casting technique.

FIG. 6 describes a second alternative method for computing eye events. The method uses a ray casting technique to determine the elements in the fixated-objects list. The figure specifies the main rendering loop of the system. Each iteration of the loop determines the fixated objects in the fixation region that correspond to the current fixation parameters, and uses those fixated objects to construct an eye event.

At the beginning of each rendering-loop iteration, the fixation parameters and fixation region are obtained. Next, the objects outside the frustum are optionally culled. This reduces the number of objects to draw, intersect, and order. Then fixation rays are constructed for each region pixel. Projecting an imaginary ray from the viewpoint through a region pixel creates a viewing ray. Each viewing ray is then intersected with the non-culled objects that make up the scene. For each viewing ray, the object closest to the viewpoint is a viewed object. The object pointers of the fixated objects are organized into the fixated-objects list. An eye event is then created, and minimally contains or references the time the event occurred, the viewing parameters, attributes of the fixation region, and the list of pointers to the fixated objects found in the fixation region.

The rendering loop is typically the main graphics loop of a simulation or game. Usually, the rendering loop runs continuously and each iteration repaints the scene on a buffer associated with the viewport. The viewport is a finite rectangle on the viewing plane. The viewing plane is an infinite plane between the viewpoint and the objects in the graphics scene. When the scene is rendered, graphical objects are projected onto the viewport to create a 2D projection of the 3D scene. The viewport is subdivided into rectangular elements of equal size called pixels. The pixels are configured in rows and columns, and cover the viewport. Each pixel contains display, depth, and masking information. The pixel display information is represented in a data structure called a surface or a buffer. The display surface is the data structure associated with the graphics display. The pixel depth information is represented in a data structure called the Z-buffer. The pixel mask information is represented in a data structure called the stencil buffer. Examples of rendering loops can be found in popular DirectX and OpenGL documentation.

The object is a class object, structure, or other computer data element that represents a graphical object. Typically such objects contain location, animation, and rendering information. Additional information that describes object properties or behaviors may also be included. The use of objects to represent the graphical objects found in computer games and simulations is well known. Detailed description of such techniques can be found in numerous computer graphics texts.

The object pointer is a computer word that points to an object location. The object pointer contains an address where the computer object that represents the graphics object is found.

The fixation parameters are the viewpoint, lookatpoint, and upvector. The viewpoint is the point from which the scene is viewed. It can be thought of as being the position of the eye that views the scene. The lookatpoint or display fixation point is the point on the viewport at which the eye is pointed. The upvector is a vector that defines the up direction of the scene. The fixation parameters can be obtained from an actual eye-tracking device, a virtual eye-tracker, a device that emulates an eye-tracker, or a cognitive architecture that models eye movement. An eye-tracker is a hardware device that follows an individual's eyes to determine current eye position. An eye-tracker can be obtained as a commercial product. Typical eye-trackers capture eye position every $1/30^{th}$ of a second or faster. The software that accompanies most eye-trackers includes an API for integrating the eye-tracker directly into application systems and registering the eye position with the application display screen to produce the display fixation point.

The fixation region is a collection of pixels on the viewport. The fixation region is calculated as a function of the lookatpoint and the viewport. The fixation region may or may not be contiguous. It may be thought of as a set of pixels in the viewport. Typically the fixation region is a circular or rectangular region centered at the lookatpoint. In the simplest case, the fixation region becomes a fixation point when the fixation region corresponds to a single pixel on the viewport.

The non-culled objects are the graphical objects that are contained within the viewing frustum. The viewing frustum is the part of the 3D space that is projected onto the viewport. The exact shape of the frustum varies, but typically it is a rectangular pyramid. The planes that define the frustum perpendicular to the viewing direction are called the near plane and the far plane. Objects that are closer to the viewpoint than the near plane are not in the frustum. Objects beyond the far plane are not in the frustum. Frustum culling is the process of removing objects that lie completely outside the viewing frustum from the rendering process. Since the culled objects cannot appear in the scene, there is no point in drawing them. Thus, only non-culled objects need to be drawn and redrawn.

The fixated objects are the objects that are visible in the fixation region on the viewing plane.

The fixated-objects list is a list of object pointers that reference the fixated objects that are visible on the viewing plane and in the fixation region. This list is initially null and is dynamically constructed through this computation method.

The backbuffer or display backbuffer implements a standard graphics technique in which the backbuffer and the display surfaces are flipped. Graphics objects are drawn on the backbuffer until the scene is fully painted. Then the back and display buffers are flipped. That is the backbuffer becomes the display surface and the display surface becomes the backbuffer surface. Routines to implement these operations are normally found in the SDKs of the graphics libraries supported by the computer video card.

The eye event is a computer data element that represents the occurrence of fixated objects. The eye event minimally includes the time the fixation region was sampled, the fixation region properties, the fixated-objects list, and possibly the type of movement that produced the event. The eye events provide access to the fixated objects. Since the fixated objects are stored as class objects, methods that further describe the fixated objects can be developed and accessed by trapping the eye events. This enables programs that use eye events to perform such operations as asking objects to describe themselves, initiating object behaviors, and animating objects in response to viewing.

The method described with reference to FIG. 6 calculates the fixated objects for a single fixation region. The method can be extended in an obvious manner to calculate the fixated objects for multiple fixated regions. The method described with reference to FIG. 6 does not alter the rendering pipeline associated with modern computer video cards. Rather, it calculates the fixated objects using simple geometric concepts and paints the scene using standard graphics techniques.

Figure 7:
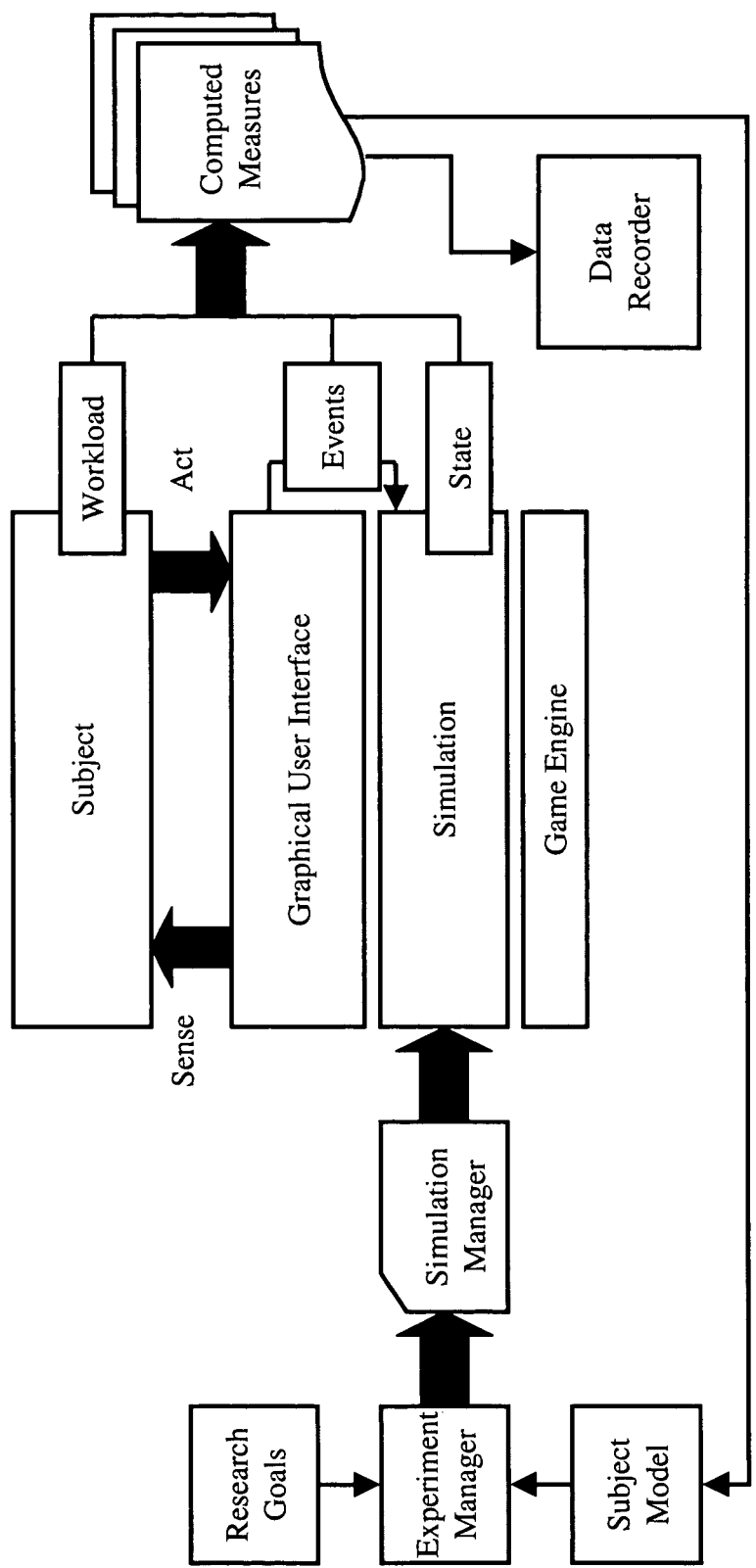
FIG. 7 is a block diagram representation of an eye-event-based research system that represents a first alternative embodiment of the invention.

FIG. 7 is a schematic drawing of a research subject using an alternative embodiment of the present invention by interacting through a graphical user interface with a computer simulation that may be built using a game engine. A simulation manager responds to feedback that results from subject interaction with the interface by dynamically directing the activities and presentation of the simulation. As the simulation is running, workload, event loop, and simulation state data are collected and combined to form computed measures that may be recorded using a data recorder for later analysis and/or playback. The computed measures are fed back into a subject model that represents current student understanding. An experiment manager compares the data found in the subject model with the overall research goals and provides direction to the simulation manager.

The system is intended to collect data on a subject while conducting a high-performance skill. The computed measures capture subtle performance aspects. The eye events enable the development of this system as they capture the manner in which the subject utilizes critical cognitive resources. This enables the development of computed measures that couple subject workload and simulation state to cognitive activities.

The subject is an individual whose performance is currently being measured by the system. Alternatively, the subject can be modeled using a cognitive architecture such as ACT-R [Anderson, et al., 1997], MIDAS [Hart, et al., 2001], and EPIC [Kieras & Meyer, 1997].

The research goals describe the overall goals associated with measuring subject skills. These goals are normally developed offline by the research investigators.

The experiment manager decides how best to develop subject skills. The manager reviews the collected data and recommends the experiment course of action to the simulation manager.

The subject model maintains an understanding of the current state of subject performance. It receives feedback from the computed measures and uses this feedback to update the current state.

The simulation manager directs the simulation to exhibit behaviors that enable further data collection directed at exploring the research goals. The graphical user interface, simulation, game engine, workload, events, state, computed measures, and data recorder are as described under FIG. 1.

Figure 8:
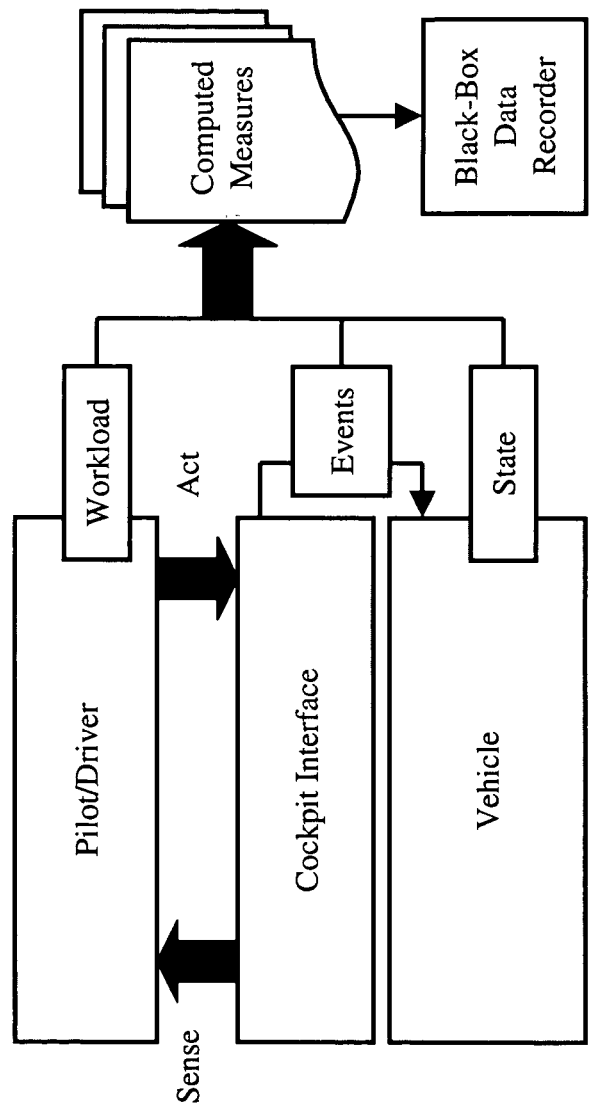
FIG. 8 is a block diagram representation of an eye-event-based "black box" vehicle data recorder that represents a second alternative embodiment of the invention.

FIG. 8 is a schematic drawing of a pilot/driver using an alternative embodiment of the present invention by interacting through a cockpit interface with a vehicle. As the vehicle is in operation, workload, events, and vehicle state data are collected and combined to form computed measures that are recorded using a black box data recorder for later analysis and/or playback.

The system captures computed measures in a vehicle "black box" that can be analyzed after critical events to fully understand the cognitive activity of the pilot/driver. The eye events enable the development of this system as they capture the manner in which the subject utilizes critical cognitive resources. This enables the recording of computed measures that couple subject workload and simulation state to cognitive activities.

The pilot/driver represents an aircraft pilot or an automotive driver. The driver may be either onboard or remote. The cockpit interface is a virtual interface found in modern vehicles, a model of the static view of a physical cockpit, or a hybrid virtual-physical cockpit. The vehicle is an aircraft or automobile. The vehicle may be real or simulated.

The pilot/driver workload can be measured using a variety of methods that are well known to the field of biomedical engineering. Typical methods described in the literature include cardiac measurement methods such as heart rate and HRV; ocular measurement methods such as blink rate and blink duration; respiratory measurement methods such as respiration rate and depth; brain activity measurement methods such as EEG, ERP, ERN, PET, fMRI, NIR, and fNIR. An overview of such methods can be found in The BioMedical Engineering Handbook edited by J. D. Bronzino, and published in 1995 by CRC Press, Inc.

The events consist of pilot/driver interactions with the cockpit interface and eye-events. The cockpit events include such operations as steering, joystick movement, throttle adjustments, button pushing, and switch throwing. The eye-events are produced when the user visually fixates an object present in the cockpit interface. Some objects present in the cockpit interface may be registered to real-world entities to produce an augmented reality component of the interface.

The state represents the current condition of the dynamic nature of the vehicle. The state can be represented by a variety of standard computer representations such as a vector, array, structure, object, or finite state machine. It may include a history of conditions that allowed the vehicle to reach the current state. It may also include a set of attributes that further describe each of the elements of the current state.

The computed measures are calculated using the following: pilot/driver workload values, events from the augmented event loop, and the state of the vehicle. These measures quantify operator interaction with the vehicle. These measures may also include pass-through values associated with workload, events, and state values.

The black-box data recorder records the operator workload, events from the augmented event loop, vehicle states, and the computed measures for later review and analysis. This recorder may be hardened to withstand vehicle crashes and fires.

Figure 9:
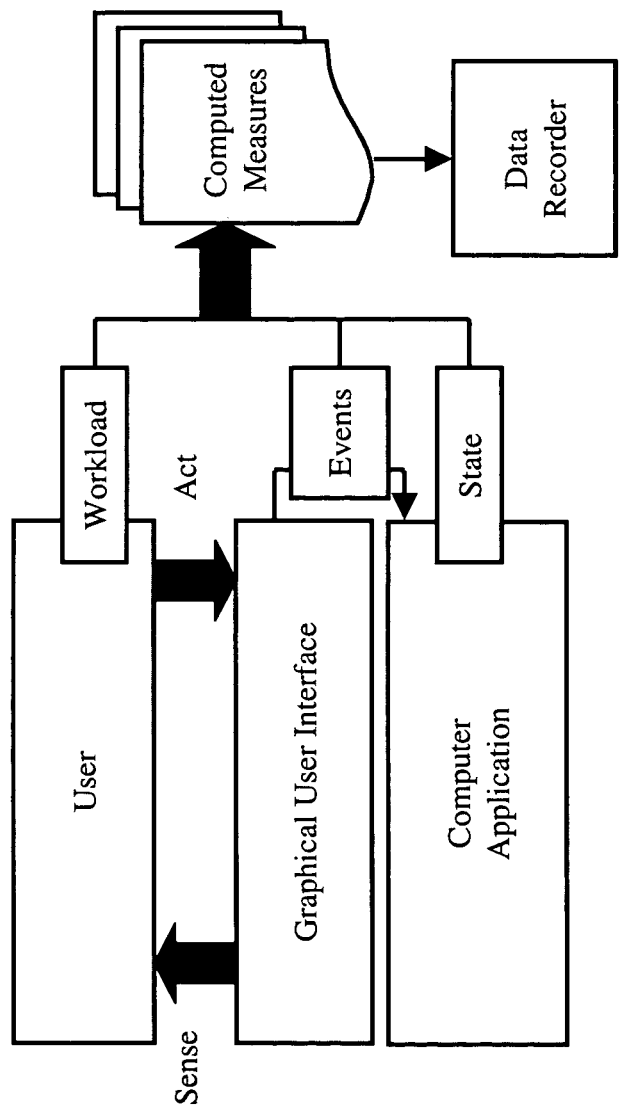
FIG. 9 is a block diagram representation of an eye-event-based interface evaluation system that represents a third alternative embodiment of the invention.

FIG. 9 is a schematic drawing of a computer user using an alternative embodiment of the present invention by interacting through a graphical user interface with a computer application. As the computer application is running, workload, events, and computer application state data are collected and combined to form computed measures that are recorded for later analysis and/or playback.

The system analyzes user interactions with a computer application. The eye events enable the development of this system as they capture the manner in which the subject utilizes critical cognitive resources. This enables the development of computed measures that couple subject workload and simulation state to cognitive activities.

The user is an individual that is operating a computer application. The computer application is any computer program that is operated using a graphical user interface. The application state is the current status of the application at a given instant in time. The computed measures are calculated from the following: user workload values, events from the augmented event loop, and the state of the computer application. These measures quantify concepts that evaluate user performance with the computer application.

The data recorder records the user workload, the events from the augmented event loop, the simulation states, and the computed measures for later review and analysis. The graphical user interface, workload, and events are as described in FIG. 1.

Figure 10:
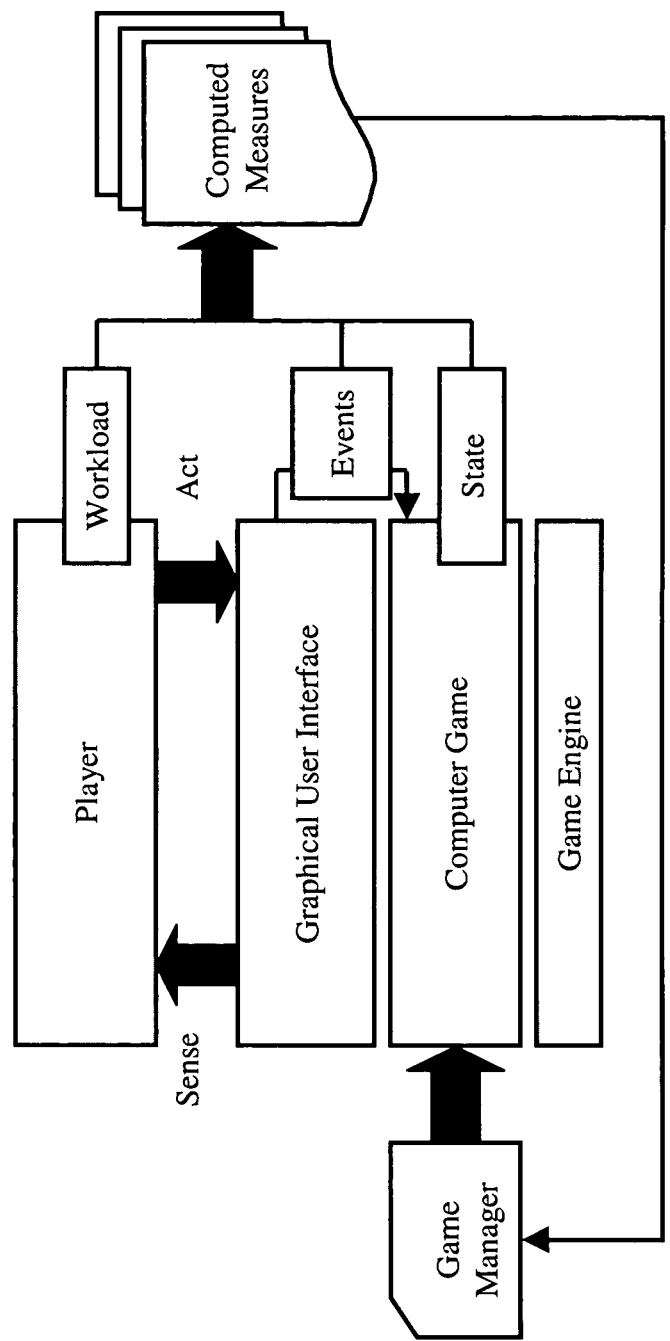
FIG. 10 is a block diagram representation of an eye-event-based computer game that represents a fourth alternative embodiment of the invention.

FIG. 10 is a schematic drawing of a computer game player using an alternative embodiment of the present invention by interacting through a graphical user interface with a computer game that may be built using a game engine. As the game is running, player workload, events, and computer game state data are collected and combined to form computed measures that feedback into a game manager. The game manager controls the game and uses this feedback to create interesting game behaviors.

The system describes computer games that exhibit interesting and meaningful behavior in response to player eye movements. For example, consider a computer game in which the player takes the role of a football quarterback, and the defensive players within the game respond to the quarterback's visual attention. Such interactions would make the game playing more realistic and facilitate the development of quarterback skills. The eye events enable the development of this system as they capture the visual behavior of the player. This enables the game to exhibit reactive behaviors.

The player is an individual that is playing the computer game. The computer game is a computer application that is used for entertainment or skill development. It may be implemented on a conventional computer, a game playing station, or a game box.

The game state represents the current condition of the dynamic nature of the game at an arbitrary point in time. The state can be represented by a variety of standard computer representations such as a vector, array, structure, object, or finite state machine. It may include a history of conditions that allowed the game to reach the current state. It may also include a set of attributes that further describe each of the elements of the current state.

The computed measures are calculated using the following: player workload values, events from the augmented event loop, and the state of the game. These measures quantify player interaction with the game. These measures may also include pass-through values associated with workload, events, and state values.

The objects within the computer game are graphic objects or graphic entities that exhibit behavior that promotes game play. Fixated objects may be calculated for the game player or the graphic entities within the game. For the game player, fixated objects are the objects within the game environment that the player visually fixates. For the game entities, fixated objects are the graphic objects that the graphic entity visually fixates with simulated eye or sensor movement. In general, the calculation of fixated objects enables the development of broader entity behavior within the game world and more interesting game experience for the game player.

The game manager controls the behaviors of the game. It receives the computed measures as feedback and uses those measures to control game behaviors. The graphical user interface, workload, events, and game engine are as described in FIG. 1.

Figure 11:
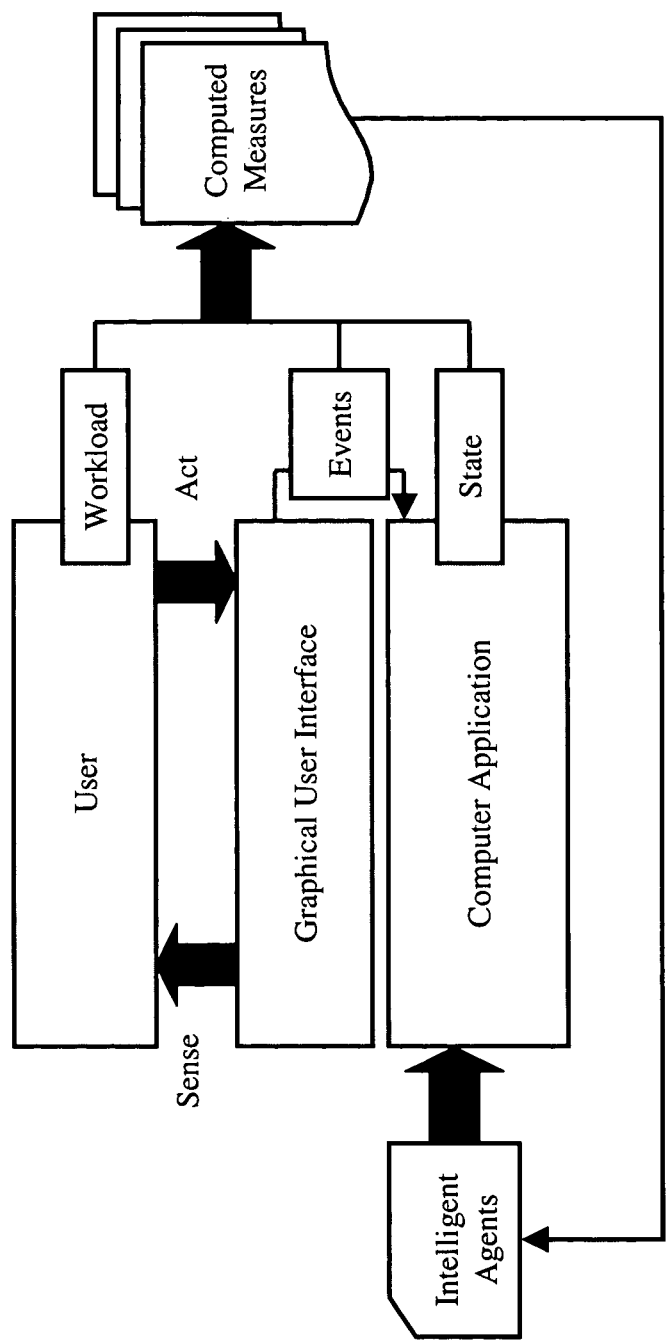
FIG. 11 is a block diagram representation of an eye-event-based cooperative user interface that represents a fifth alternative embodiment of the invention.

FIG. 11 is a schematic drawing of a computer user using an alternative embodiment of the present invention by interacting through a graphical user interface with a computer application. As the application is running, user workload, events, and computer application state data are collected and combined to form computed measures that feedback into one or more intelligent agents. The intelligent agents work with the computer user to cooperatively operate the computer application.

The system creates a cooperative computer environment in which the user and the intelligent agents cooperatively solve the computer application or task. The system provides the capability for the intelligent agents to monitor user behavior and suggest alternative behavior and/or construct their own behaviors that are synergistic to user behavior. The system encourages cooperative problem or task solution by the user and the intelligent agents. The eye events enable the development of this system as they capture the visual behavior of the user and enable the intelligent agents to understand user behavior and execute synergistic problem solving activities.

The user is an individual that is working with the computer application to cooperatively solve a problem or complete a task. The computer application is an arbitrary computer program that is operated through a graphical user interface. The computer application may also control or manage another system or mechanical device.

The state represents the current condition of the dynamic nature of the computer application at an arbitrary point in time. The state can be represented by a variety of standard computer representations such as a vector, array, structure, object, or finite state machine. It may include a history of conditions that allowed the game to reach the current state. It may also include a set of attributes that further describe each of the elements of the current state.

The computed measures are calculated using the following: user workload values, events from the augmented event loop, and the state of the computer application. These measures may also include pass-through values associated with workload, events, and state values. These measures enable the intelligent agents to monitor user behavior and suggest other user behaviors or adaptively direct their own behavior towards other aspects of the problem.

The intelligent agents are one or more computer tasks, subroutines, procedures, or class objects that are independently operating to cooperatively solve the problem presented by the computer application. The graphical user interface, workload, and events are as described in FIG. 1.

I claim:
1. A method of generating an eye event, comprising the steps of:
    obtaining user fixation parameters;
    selecting a fixation region on a display device;
    iteratively drawing one or more objects on the display device;

analyzing an attribute of each drawn object to determine if the user is fixated on that object;
generating an eye event as a function of the fixated objects, if any;
defining a set of instructional goals including training objectives;
simulating a learning environment using a display with pixels and a user interface;
computing various measures based upon the trainee interactions, including the eye event and simulation state;
recording and time-stamping the computed measures;
recording current user skill level based upon the computed measures;
correlating current trainee skill level with the training objectives; and
modifying the learning environment in accordance with the correlation.

2. The method of claim 1, wherein the goals are educational research goals.

3. The method of claim 1, wherein the computed measures that are derived using subject workload metrics.

4. The method of claim 1, wherein the simulated learning environment involves vehicle or aircraft control.

5. The method of claim 1, wherein the simulated learning environment is a computer application.

6. The method of claim 1, wherein the simulated learning environment is a computer game.

7. The method of claim 1, wherein the simulated learning environment is a cooperative problem solving environment.

8. A method of generating an eye event, comprising the steps of:
  a) obtaining fixation parameters within a rendered scene;
  b) selecting a fixation region within the rendered scene;
  c) selecting an object in the region, the object being rendered as a set of pixels;
  d) redrawing the object into buffer;
  e) comparing the pixels of the object before and after the redraw to determine if there were changes and, if so, marking the object as fixated;
  f) iterating through steps c) through e) for each object in the region;
  g) constructing an eye event based upon the fixated objects, if any.

9. The method of claim 8, further including the steps of:
defining a set of instructional goals including training objectives;
simulating a learning environment using a display with pixels and a user interface;
computing various measures based upon the trainee interactions, including the eye event and simulation state;
recording and time-stamping the computed measures;
recording current user skill level based upon the computed measures;
  correlating current trainee skill level with the training objectives;
  and modifying the learning environment in accordance with the correlation.

10. The method of claim 9, wherein the goals are educational research goals.

11. The method of claim 9, wherein the computed measures that are derived using subject workload metrics.

12. The method of claim 9, wherein the simulated learning environment involves vehicle or aircraft control.

13. The method of claim 9, wherein the simulated learning environment is a computer application.

14. The method of claim 9, wherein the simulated learning environment is a computer game.

15. The method of claim 9, wherein the simulated learning environment is a cooperative problem solving environment.

16. A method of generating an eye event, comprising the steps of:
  a) obtaining fixation parameters within a rendered scene;
  b) selecting a fixation region within the rendered scene;
  c) constructing a data structure having one or more object pointers, each indexed to an object key;
  d) as the object is drawn, writing the object key into a field in the non-display pixel bits for each pixel of the object that is drawn;
  e) after the object is drawn, retrieving the object keys for the pixels in the fixation region and using the keys to lookup the object pointers in the data structure; and
  f) generating an eye event based upon the object pointers.

17. The method of claim 16, further including the steps of:
defining a set of instructional goals including training objectives;
simulating a learning environment using a display with pixels and a user interface;
computing various measures based upon the trainee interactions, including the eye event and simulation state;
recording and time-stamping the computed measures;
recording current user skill level based upon the computed measures;
  correlating current trainee skill level with the training objectives;
  and modifying the learning environment in accordance with the correlation.

18. The method of claim 17, wherein the goals are educational research goals.

19. The method of claim 17 wherein the computed measures that are derived using subject workload metrics.

20. The method of claim 17, wherein the simulated learning environment involves vehicle or aircraft control.

21. The method of claim 17, wherein the simulated learning environment is a computer application.

22. The method of claim 17, wherein the simulated learning environment is a computer game.

23. The method of claim 17, wherein the simulated learning environment is a cooperative problem solving environment.

24. A method of generating an eye event, comprising the steps of:
  a) obtaining fixation parameters;
  b) selecting a fixation region;
  c) constructing an imaginary eye ray through the fixation region;
  d) intersecting the eye ray with any object associated with the fixation region;
  e) ordering the intersecting object(s) along the eye ray;
  f) identifying a fixation objects as the intersecting object closest to a viewer; and
  g) generating an eye event based upon the fixated objects, if any.

25. The method of claim 24, further including the steps of:
defining a set of instructional goals including training objectives;
simulating a learning environment using a display with pixels and a user interface;
computing various measures based upon the trainee interactions, including the eye event and simulation state;
recording and time-stamping the computed measures;
recording current user skill level based upon the computed measures;
correlating current trainee skill level with the training objectives; and modifying the learning environment in accordance with the correlation.

26. The method of claim 25, wherein the goals are educational research goals.

27. The method of claim 25, wherein the computed measures that are derived using subject workload metrics.

28. The method of claim 25, wherein the simulated learning environment involves vehicle or aircraft control.

29. The method of claim 25, wherein the simulated learning environment is a computer application.

30. The method of claim 25, wherein the simulated learning environment is a computer game.

31. The method of claim 25, wherein the simulated learning environment is a cooperative problem solving environment.

* * * * *